United States Patent
Quiers

(10) Patent No.: US 9,781,273 B2
(45) Date of Patent: Oct. 3, 2017

(54) TELECONFERENCING USING MONOPHONIC AUDIO MIXED WITH POSITIONAL METADATA

(71) Applicant: DOLBY LABORATORIES LICENSING CORPORATION, San Francisco, CA (US)

(72) Inventor: Francis C. Quiers, Beaconsfield (GB)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/214,820

(22) Filed: Jul. 20, 2016

(65) Prior Publication Data

US 2016/0330326 A1 Nov. 10, 2016

Related U.S. Application Data

(63) Continuation of application No. 14/443,037, filed as application No. PCT/US2013/068980 on Nov. 7, 2013, now Pat. No. 9,491,299.
(Continued)

(51) Int. Cl.
H04M 3/42 (2006.01)
H04M 3/56 (2006.01)
H04L 29/06 (2006.01)

(52) U.S. Cl.
CPC .......... *H04M 3/568* (2013.01); *H04L 65/403* (2013.01); *H04L 65/602* (2013.01)

(58) Field of Classification Search
CPC ..... H04M 3/568; H04L 65/602; H04L 65/403
(Continued)

(56) References Cited

U.S. PATENT DOCUMENTS

| 5,613,010 A | 3/1997 | Heyl |
|---|---|---|
| 7,417,983 B2 | 8/2008 | He |

(Continued)

FOREIGN PATENT DOCUMENTS

| EP | 1298906 | 4/2003 |
|---|---|---|
| EP | 1954019 | 8/2008 |
| GB | 2416955 | 2/2006 |

OTHER PUBLICATIONS

Brungart, D.S. et al "Improving Multitalker Speech Communication with Advanced Audio Displays" pp. 30-1-30-18, Meeting Proceedings RTO-MP-HFM-123, 2005.
(Continued)

*Primary Examiner* — Quynh Nguyen

(57) ABSTRACT

In some embodiments, a method for preparing monophonic audio for transmission to a node of a teleconferencing system, including steps of generating a monophonic mixed audio signal, including by a mixing a metadata signal (e.g., a tone) with monophonic audio indicative of speech by a currently dominant participant in a teleconference, and encoding the mixed audio signal for transmission, where the metadata signal is indicative of an apparent source position for the currently dominant conference participant. Other embodiments include steps of decoding such a transmitted encoded signal to determine the monophonic mixed audio signal, identifying the metadata signal, and determining the apparent source position corresponding to the currently dominant participant from the metadata signal. Other aspects are systems configured to perform any embodiment of the method or steps thereof.

14 Claims, 3 Drawing Sheets

Related U.S. Application Data

(60) Provisional application No. 61/730,136, filed on Nov. 27, 2012.

(58) Field of Classification Search
USPC .................................. 379/202.01; 370/260
See application file for complete search history.

(56) References Cited

U.S. PATENT DOCUMENTS

| | | |
|---|---|---|
| 7,430,506 B2 | 9/2008 | Nam |
| 7,839,803 B1 | 11/2010 | Snelgrove |
| 7,953,270 B2 | 5/2011 | Rhoads |
| 8,073,125 B2 | 12/2011 | Zhang |
| 2004/0010549 A1 | 1/2004 | Matus |
| 2004/0039464 A1 | 2/2004 | Virolainen |
| 2006/0198542 A1 | 9/2006 | Benjelloun Touimi |
| 2007/0025538 A1 | 2/2007 | Jarske |
| 2007/0133437 A1 | 6/2007 | Wengrovitz |
| 2008/0095077 A1 | 4/2008 | Vadlakonda |
| 2008/0144794 A1 | 6/2008 | Gardner |
| 2010/0063828 A1 | 3/2010 | Ishikawa |
| 2010/0241256 A1 | 9/2010 | Goldstein |
| 2010/0246832 A1 | 9/2010 | Villemoes |
| 2010/0284310 A1 | 11/2010 | Shaffer |
| 2011/0043600 A1 | 2/2011 | Gopal |
| 2011/0294501 A1 | 12/2011 | Wang |
| 2012/0069134 A1 | 3/2012 | Garcia, Jr. |
| 2012/0163610 A1* | 6/2012 | Sakagami ............ H04R 3/005 381/56 |

OTHER PUBLICATIONS

Goertzel, Gerald, "An Algorithm for the Evaluation of Finite Trigonometric Series" The American Mathematical Monthly, vol. 65, No. 1, pp. 34-35, Jan. 1958.

* cited by examiner

TELECONFERENCING USING MONOPHONIC AUDIO MIXED WITH POSITIONAL METADATA

CROSS-REFERENCE TO RELATED APPLICATIONS

This application is a continuation of U.S. patent application Ser. No. 14/443,037, filed May 14, 2015, which in turn is the 371 national stage of PCT Application No. PCT/US2013/068980, filed Nov. 7, 2013, which claims priority to U.S. Provisional Patent Application No. 61/730,136, filed Nov. 27, 2012, each of which is hereby incorporated by reference in its entirety.

TECHNICAL FIELD

The invention pertains to systems and methods (e.g., circuit-switched teleconferencing systems and methods) for mixing a metadata signal with monophonic audio to be encoded and transmitted to a node of a teleconferencing system, and for rendering such audio as an output soundfield using an apparent source position determined by the metadata signal.

BACKGROUND

Conventional circuit-switched (CS) teleconferencing systems typically employ monophonic ("mono") codecs. Examples of conventional CS conferencing systems of this type are the well-known Global System for Mobile Communications (GSM) and Universal Mobile Telecommunications System (UMTS) CS networks. Each monophonic encoded audio signal transmitted between nodes of such a system can be decoded and rendered to generate a single speaker feed for driving a speaker set (typically a single loudspeaker or a headset). However, the speaker feed cannot drive the speaker set to emit sound perceivable by a listener as originating at apparent source locations distinct from the actual location(s) of the loudspeaker(s) of the speaker set.

Even when a participant in a multi-participant telephone call implemented by a conventional CS conferencing system of this type uses an endpoint (e.g., a mobile phone) coupled to a multi-transducer headset or pair of headphones, if the endpoint generates a single speaker feed to drive the headset or headphones, the participant is unable to benefit from any spatial voice rendering technology that might otherwise improve the user's experience by providing better intelligibility via the spatial separation of voices of different participants. This is because the endpoint of such a conventional CS system cannot generate (in response to a received mono audio signal) multiple speaker feeds for driving multiple speakers to emit sound perceivable by a listener as originating from different conference participants, each participant at a different apparent source location (e.g., participants at different apparent source locations distinct from the actual locations of the speakers).

Conventional packet-switched (PS) conferencing systems can be configured to send to an endpoint a multichannel audio signal (e.g., with different channels of audio sent in different predetermined slots or segments within a packet, or in different packets) and optionally also metadata (e.g., in different packets, or different predetermined slots or segments within packets, than those in which the audio is sent). For example, UK Patent Application GB 2,416,955 A, published on Feb. 8, 2006, describes conferencing systems configured to send to endpoints a multichannel audio signal (with each channel comprising speech uttered at a different endpoint) and metadata (a tagging identifier for each channel) identifying the endpoint at which each channel's content originated, with each receiving endpoint configured to implement spatial voice rendering technology to generate multiple speaker feeds in response to the transmitted audio and metadata. Conventional PS conferencing systems could also be configured to send a mono audio signal and associated metadata, with the audio and metadata in different packets (or in different predetermined slots or segments within a packet), where the mono signal together with the metadata are sufficient to enable generation of a multichannel audio signal in response to the mono signal. Each receiving endpoint of such a system could be configured to implement spatial voice rendering technology to generate multiple speaker feeds (in response to transmitted multichannel audio, or mono audio with metadata of the above-noted type) for driving multiple speakers to emit sound perceivable by a listener as originating from different conference participants, each participant at a different apparent source location. Of course, each node (endpoint or server) of the system would need to share a protocol for interpretation of the transmitted data. Thus, a conventional decoder (which does not implement the protocol required to identify and distinguish between different channels of transmitted multi-channel audio, or between metadata and monophonic audio transmitted in different packets or different slots or segments of a packet) could not be used in a receiving endpoint which renders the transmitted audio as an output soundfield. Rather, a special decoder (which implements the protocol required to distinguish between different channels of transmitted multi-channel audio, or between transmitted metadata and monophonic audio) would be needed.

In contrast, a conventional teleconferencing system (e.g., a conventional CS teleconferencing system) can be modified in accordance with typical embodiments of the present invention to become capable of generating mixed monophonic audio and metadata (meta information) regarding conference participants, and encoding the mixed monophonic audio and metadata for transmission over a link (e.g., a mono audio channel of the link) of the system, without any need for modifying the encoding scheme (e.g., a standardized encoding scheme) or decoding scheme (e.g., a standardized decoding scheme) implemented by any node of the system. A conventional decoder could decode the encoded, transmitted signal to recover the mixed monophonic audio and metadata, and simple processing would typically then be performed on the recovered mixed monophonic audio and metadata to identify the metadata (and typically also to remove, e.g., by notch filtering, the metadata from the monophonic audio).

Typical embodiments of the invention employ the simple but efficient idea of in-band signaling using tones, in the context of transmitting metadata tones mixed with monophonic audio (indicative of a dominant teleconference participant) to enable rendering of the monophonic audio as a soundfield. An example of conventional use of in-band signaling using tones is the transmission of Dual-Tone Multiple Frequencies (DTMF) tones, widely implemented in current telecommunications systems (although not for the purpose of carrying spatial audio information, or metadata enabling the rendering of monophonic teleconference audio as a soundfield).

BRIEF DESCRIPTION OF THE INVENTION

In a first class of embodiments, the invention is a method for preparing monophonic audio for transmission to at least one node of a teleconferencing system (e.g., a CS teleconferencing system), where the monophonic audio is indicative of speech, in a frequency range, uttered by a currently dominant participant in a teleconference (and optionally also speech in the frequency range uttered by at least one other participant in the teleconference), said method including the steps of:

(a) generating a monophonic mixed audio signal, including by a mixing a metadata signal (e.g., a metadata tone) with the monophonic audio, wherein the metadata signal (sometimes referred to herein as "metadata") comprises at least one frequency component in the frequency range (e.g., the metadata is a tone having a frequency in said frequency range), and the metadata signal is indicative of an apparent source position of the currently dominant participant in the teleconference (e.g., a currently active talker or the loudest one of multiple active talkers); and (b) encoding the mixed audio signal to generate a monophonic encoded audio signal.

Typically, the method also includes a step of transmitting the monophonic encoded audio signal over a monophonic audio channel of a link of the teleconferencing system. Typically, the encoding step is identical to a conventional encoding step which could be employed to encode the monophonic audio without any metadata signal mixed therewith. For example, in typical embodiments, the method is performed by a system (e.g., a teleconferencing server) including a conventional, unmodified encoder, and a subsystem coupled and configured to mix a metadata tone with the monophonic audio to generate the mixed audio signal and assert said mixed audio signal to the encoder for encoding. In typical embodiments, the metadata tone is a high-frequency tone in the range from 5 kHz to 6.4 kHz. For example, in a class of embodiments, the metadata tone has a frequency in the range from 5 kHz to 6.4 kHz, and the method is performed by a system including an encoder compliant with the conventional AMR-WB (Adaptive Multi-Rate-Wideband) standard.

In alternative embodiments, a metadata signal which is not a single-frequency tone, but which is indicative of an apparent source position of a currently dominant conference participant, is mixed with the monophonic audio to be encoded. For example, the metadata signal could be a burst of some predetermined audio signal (e.g., a predetermined burst of speech).

The metadata signal mixed with the monophonic audio in step (a) typically belongs to a set of metadata signals having predetermined characteristics (e.g., a set of metadata tones each having a different frequency within the frequency range of the monophonic audio), each of the metadata signals in the set having a different, distinctive characteristic, and each of the metadata signals corresponds to a different apparent source position relative to a user (e.g., a different angle relative to the median plane of the user or of headphones of the user). The method typically includes steps of: determining a set of apparent source positions, each of the apparent source positions in the set corresponding to a different participant in the teleconference; and generating the metadata signal such that said metadata signal is indicative of one of the apparent source positions in the set. Preferably, each of the metadata signals is such that it is unlikely to be significantly distorted during the encoding, transmission, decoding, and any other processing, that the mixed monophonic audio and metadata is expected to undergo, and each of the metadata signals is easily identifiable by the endpoint which receives and decodes the encoded mixed monophonic audio and metadata. It is contemplated that the metadata signal mixed with the monophonic audio in preferred embodiments is a single-frequency tone. Such a tone is unlikely to be significantly distorted during typical encoding, transmission, decoding, and other processing, of the mixed monophonic audio and metadata tone, and such a tone is easily identifiable by a tone detection subsystem of a typical endpoint which receives and decodes the encoded mixed monophonic audio and metadata tone.

In another class of embodiments, the invention is a method for processing an encoded monophonic audio signal received at a node of a teleconferencing system, wherein the encoded monophonic audio signal is an encoded version of a monophonic audio signal comprising monophonic audio (indicative of speech uttered by a currently dominant participant in a teleconference) and a metadata signal (e.g., a metadata tone) mixed with the monophonic audio, and the metadata signal is indicative of an apparent source position of the currently dominant participant, said method including the steps of:

decoding the encoded monophonic audio signal to determine the monophonic audio signal; and processing the monophonic audio signal to identify the metadata signal, and determining from the metadata signal the apparent source position (e.g., an azimuth angle) corresponding to the currently dominant participant.

In typical embodiments in this class, the method also includes steps of:

filtering the monophonic audio signal to remove at least partially therefrom the metadata signal (e.g., in the case that the metadata is a tone, by notch filtering the monophonic audio signal), thereby generating a filtered monophonic audio signal; and rendering speech determined by the filtered monophonic audio signal (e.g., over a set of headphones in use by a conference participant who is using the endpoint) as a multi-channel (e.g., binaural) signal, including by generating multi-channel speaker feeds for driving at least two loudspeakers (e.g., a pair of headphones) in such a manner that speech uttered by the currently dominant participant is perceived as emitting from the apparent source position corresponding to said currently dominant participant.

For example, in some embodiments the rendered speech is intended to be perceived by a user at an assumed position (e.g., a user wearing headphones which are symmetrical with respect to a median plane), the metadata signal is a tone which belongs to a set of tones having predetermined frequencies, each of the tones in the set having a different one of the frequencies, and each of the tones corresponds to a different apparent source position relative to the user (e.g., a different angle relative to the median plane of the user or of headphones of the user). In such embodiments, the rendered speech gives the user an impression that each different currently dominant conference participant (determined by, and corresponding to, a tone having a different one of the frequencies) is located in a different apparent position relative to the user (i.e., a different angle relative to the median plane of the user's headphones), hence improving the user's experience of the conference call.

In a class of embodiments, the inventive conferencing method includes a step of transmitting metadata (meta information) regarding conference participants by in-band signaling over a mono audio channel of a CS teleconferencing system. Typically, the system includes a set of nodes, including endpoints (each of which is typically a mobile phone or other telephone system) and at least one server. The server is configured to generate a mixed monophonic signal by mixing a metadata signal (e.g., a metadata tone) indicative of an apparent source position of a currently dominant participant in a telephone conference, with a monophonic audio signal, and to encode the mixed monophonic audio signal to generate an encoded monophonic audio signal for transmission to the endpoints. More specifically, the server is typically configured to determine an index corresponding to (indicative of) the currently dominant participant (e.g., a currently active talker or the loudest one of multiple active talkers), and to mix a tone (typically a high-frequency tone) determined by (corresponding to) the index with monophonic speech content (indicative of speech uttered by the currently dominant participant, and optionally also indicative of speech uttered by at least one other conference participant) to generate the mixed monophonic audio signal to be encoded. Each endpoint which receives the encoded mono audio signal decodes the received signal, identifies the metadata (e.g., metadata tone) mixed with the decoded signal, and determines the index corresponding to the metadata signal (thereby identifying the currently dominant conference participant and an apparent source position of the currently dominant participant). Typically also, the endpoint renders the speech determined by the decoded signal (e.g., over a set of headphones in use by a conference participant who is using the endpoint) as a binaural signal, in such a manner that speech uttered by the currently dominant participant is perceived as emitting from an apparent source whose position is determined by the most recently identified index (e.g., an apparent source positioned at a specific angle relative to the median plane of the user's assumed position). This gives the user the impression that each different conference participant (determined by, and corresponding to, a different index value) is located in a different apparent position relative to the user, hence improving the user's experience of the conference call.

The participants engaged in a telephone conversation usually talk in turns, at least for most of the time. Regardless of the mixing strategy applied by a conferencing server to generate the mono audio content to be sent to endpoints (e.g., circuit-switched endpoints), it is possible to determine an instantaneous index indicative of which talker (conference participant) is the dominant one at any time during the conference (and indicative of an apparent source position of the currently dominant participant). To implement various embodiments of the invention, any of a variety of methods (including any of a variety of conventional methods) may be performed to determine such an index.

In a class of embodiments, the index determination (and determination of audio content to be encoded) implements a simple switch between a set of input mono audio streams (each stream indicative of speech uttered by a different conference participant), in the sense that the index corresponds to (and identifies) one of the streams and this single stream (indicative of speech uttered by the dominant participant) is selected for encoding. For example, this switch could be driven by a measure of the signal power on each input line and could result in the encoding and transmission of the stream with the highest power, preferably including by employing logic for resilient performance against loud transients in order to avoid the switching from occurring too often.

Alternatively, the index identified by the server corresponds to (and identifies) one of the input audio streams including speech uttered by the dominant participant, and the server selects all the streams (or some of the input audio streams, including the stream including the dominant participant's speech) for encoding, and generates a mixed monophonic audio signal by mixing the selected streams (each indicative a speech of a different participant, including the dominant participant) together, with a metadata signal (e.g., a metadata tone) corresponding to the index. Optionally, during the mixing step the server applies relatively low gain to each stream indicative of a non-dominant participant's speech and higher gain to the stream indicative of the dominant participant's speech. The server encodes the resulting mixed signal for transmission (typically over a mono, circuit-switched channel) to at least one endpoint. Each receiving endpoint can be configured to decode the received signal, and to render the mixed signal (typically after notch-filtering, or otherwise filtering, the metadata signal out from the mixed signal) as a binaural signal in such a manner that speech uttered by each participant whose speech is indicated by the mixed signal (including the dominant participant) is perceived as emitting from an apparent source whose position is determined by the index corresponding to the most recently notch-filtered tone (e.g., an apparent source positioned at a specific angle relative to the median plane). These alternative embodiments would desirably handle situations in which multiple participants talk at the same time (e.g., one person is trying to interrupt the current talker). However, the spatial rendering would produce somewhat unnatural sound during these overlap periods, in the sense that multiple voices would be perceived as coming from a single apparent source position (e.g., from the same direction).

In a class of embodiments, once a dominant participant is identified, a corresponding index is used to generate a tone (metadata tone) of a predefined frequency specific to this particular index and located within the frequency spectrum of the monophonic audio to be encoded (e.g., the speech uttered by the dominant participant). The tone is then mixed with (e.g., added to) the monophonic audio signal (e.g., a Pulse-Code Modulated (PCM) signal indicative of speech by the currently dominant participant) to be encoded. The resulting mono signal (to which the tone has been mixed) is encoded, and the resulting encoded bit stream is then transported over a link (typically over a mono audio channel of the link) of the conferencing system. At the receiver side, the encoded signal is processed through a decoder (typically a monophonic speech decoder). The decoded signal (typically a PCM signal) output from the decoder is then processed by a tone detection algorithm. For example, the tone detection algorithm may be of the type proposed by G. Goertzel in the paper "An Algorithm for the Evaluation of Finite Trigonometric Series," The American Mathematical Monthly Vol. 65, No. 1 (January, 1958), pp. 34-35, which produces a measure of the power of the signal for each of the frequencies of the subset chosen to represent the original indexes. Once the predominant peak is identified, the decoded signal (typically a PCM signal) is processed through a notch filter so as to remove the tone from the speech signal. The resulting mono audio stream, and the decoded index, is then typically processed in accordance with a panning algorithm which produces a binaural audio stream that is finally played through the user's headset or headphones (or other loudspeakers), to give the user the impression that the current dominant talker is located at a particular apparent location determined by the index (e.g., a specific angle, determined by the index, relative to the median plane of the user's assumed position), spatially separated from the apparent locations of other conference participants. The panning and binaural audio stream generation steps are omitted in some embodiments of the invention.

In some embodiments, the inventive method is a teleconferencing method in which a node (e.g., a server, and/or at least one endpoint of a set of endpoints) of a teleconferencing system performs an embodiment of the inventive encoding method to generate encoded monophonic audio, including by encoding monophonic audio mixed with a metadata signal, where the metadata signal is indicative of an apparent source position of a currently dominant participant in a teleconference and the monophonic audio is indicative of speech by the currently dominant participant, and the node asserts the encoded monophonic audio to a link of the system, and in which at least one receiving node coupled to the link receives and decodes the encoded monophonic audio to determine the monophonic audio mixed with metadata, identifies the metadata signal, and determines an apparent source position (e.g., an azimuth angle) corresponding to the currently dominant participant indicated by the metadata. Typically, the at least one receiving node also: filters the decoded monophonic audio mixed with metadata to remove at least partially therefrom the metadata signal (e.g., in the case that the metadata signal is a tone, by notch filtering the monophonic audio signal), thereby generating a filtered monophonic audio signal; and renders speech determined by the filtered monophonic audio signal as a multi-channel (e.g., binaural) signal, including by generating multi-channel speaker feeds for driving at least two loudspeakers (e.g., a pair of headphones) in such a manner that speech uttered by the currently dominant participant is perceived as emitting from the apparent source position corresponding to said currently dominant participant.

Aspects of the invention include a system configured (e.g., programmed) to perform any embodiment of the inventive method, and a computer readable medium (e.g., a disc) which stores code (in tangible form) for implementing any embodiment of the inventive method or steps thereof. For example, the inventive system can be or include a programmable general purpose processor, digital signal processor, or microprocessor (e.g., included in, or comprising, a teleconferencing system endpoint or server), programmed with software or firmware and/or otherwise configured to perform any of a variety of operations on data, including an embodiment of the inventive method or steps thereof. Such a general purpose processor may be or include a computer system including an input device, a memory, and a processing subsystem that is programmed (and/or otherwise configured) to perform an embodiment of the inventive method (or steps thereof) in response to data asserted thereto.

NOTATION AND NOMENCLATURE

Figure 1:
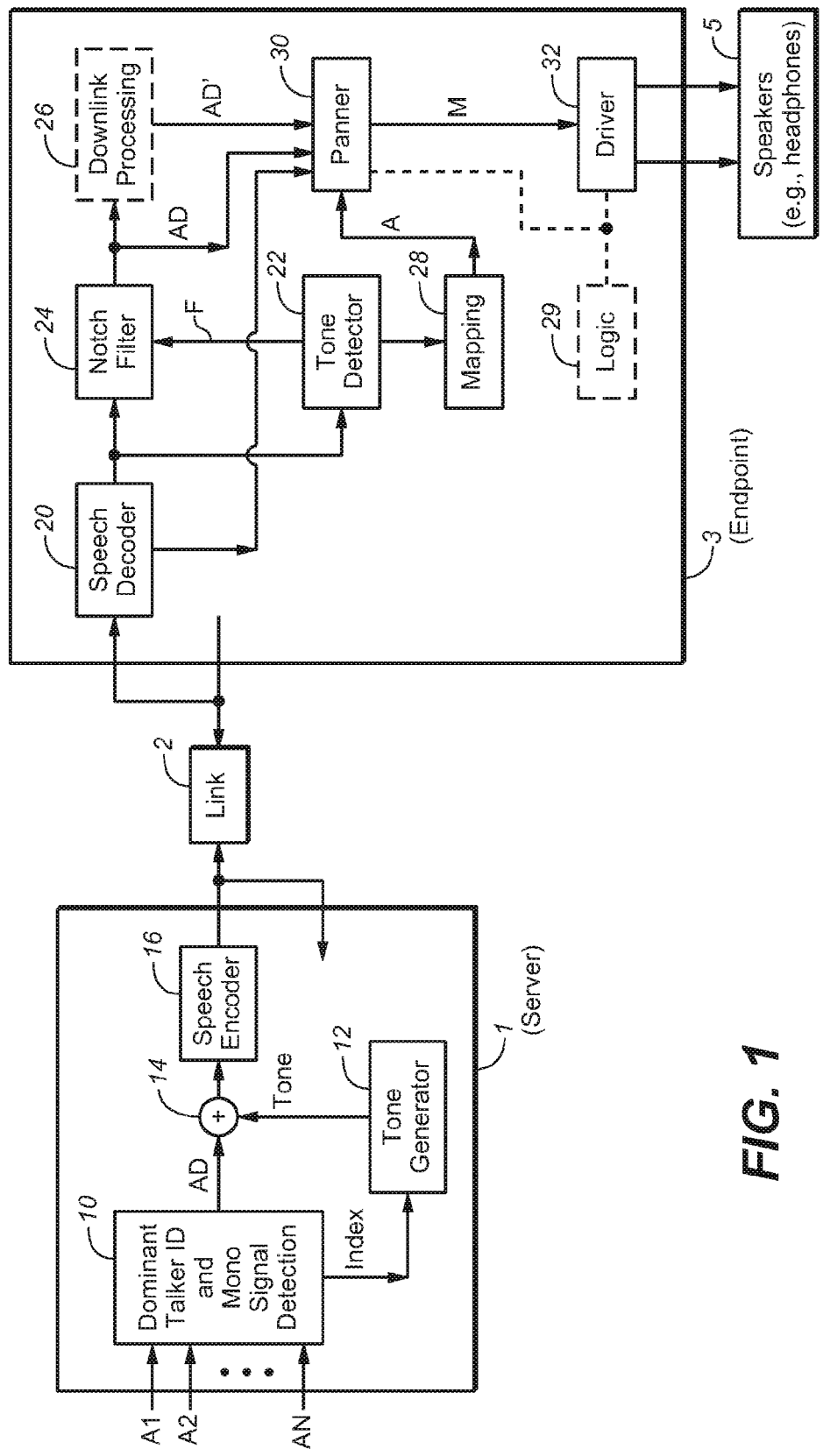
FIG. 1 is a block diagram of an embodiment of the inventive teleconferencing system.

Throughout this disclosure, including in the claims, the terms "speech" and "voice" are used interchangeably, in a broad sense to denote audio content perceived as a form of communication by a human being. Thus, "speech" determined or indicated by an audio signal may be audio content of the signal which is perceived as a human utterance upon reproduction of the signal by a loudspeaker (or other sound-emitting transducer).

Throughout this disclosure, including in the claims, "speaker" and "loudspeaker" are used synonymously to denote any sound-emitting transducer (or set of transducers) driven by a single speaker feed. A typical set of headphones includes two speakers. A speaker may be implemented to include multiple transducers (e.g., a woofer and a tweeter), all driven by a single, common speaker feed (the speaker feed may undergo different processing in different circuitry branches coupled to the different transducers).

Throughout this disclosure, including in the claims, each of the expressions "monophonic" audio, "monophonic" audio signal, "mono" audio, and "mono" audio signal, denotes an audio signal capable of being rendered to generate a single speaker feed for driving a single loudspeaker to emit sound perceivable by a listener as emanating from one or more sources, but not to emit sound perceivable by a listener as originating at an apparent source location (or two or more apparent source locations) distinct from the loudspeaker's actual location.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

DETAILED DESCRIPTION OF THE PREFERRED EMBODIMENTS

Many embodiments of the present invention are technologically possible. It will be apparent to those of ordinary skill in the art from the present disclosure how to implement them. Embodiments of the inventive system and method will be described with reference to FIGS. 1, 2, and 3.

FIG. 1 is a simplified block diagram of an embodiment of the inventive teleconferencing system, showing logical components of the signal path. The system comprises nodes (teleconferencing server 1 and endpoint 3, and optionally other endpoints) coupled to each other by link 2. Each of the endpoints is a telephone system (e.g., a telephone). In typical implementations, link 2 is a link (or access network) of the type employed by a conventional Voice over Internet Protocol (VOIP) system, data network, or telephone network (e.g., any conventional telephone network) to implement data transfer between telephone systems. In typical use of the system, users of at least two of the endpoints are participating in a telephone conference.

The FIG. 1 system is a circuit-switched (CS) teleconferencing system, and each node of the system is configured to perform encoding of monophonic ("mono") audio for transmission over link 2 and decoding of encoded mono audio received from link 2. For example, each node may include a mono codec configured to perform such encoding and decoding.

Server 1 of FIG. 1 includes encoder 16, which is coupled and configured to assert to link 2 an encoded monophonic audio signal for transmission via link 2 to endpoint 3 and the other endpoints of the system. Server 1 is also configured to receive (and decode) encoded mono audio signals transmitted over link 2 from other nodes of the system.

More specifically, server 1 of FIG. 1 is coupled to receive monophonic input audio signals A1-AN, where N is an integer greater than one. Typically, some or all of the input audio signals are received by server 1 via link 2 from other nodes of the system (e.g., from endpoint 3 and other nodes not shown in FIG. 1). Each of the input audio signals A1-AN is indicative of monophonic audio content captured at a different endpoint of the system, and the audio captured at each endpoint is in turn indicative of speech uttered by a different one of N participants in a telephone conference (and noise).

In a typical implementation, dominant participant identification and monophonic audio signal selection stage 10 of server 1 is configured to output a selected one of the input audio signals A1-AN, identified in FIG. 1 as monophonic audio signal AD, which it determines to be indicative of speech uttered by the currently dominant one of the conference participants. Stage 10 is also configured to determine an index (i.e., data indicative of one of N different index values) which identifies the currently dominant one of the N conference participants, and is coupled and configured to assert the index to tone generation stage 12.

In response to the index from stage 10, tone generation stage 12 outputs a tone whose frequency is one of a predefined set of frequencies, each frequency in the set corresponding to a different value of the index. The frequency of the tone output from stage 12 is specific to the current value of the index, and is within the frequency spectrum of typical speech. In one implementation, stage 12 implements pre-computed Read-Only Memory (ROM) tables, each of which outputs a tone (or stored data indicative of a tone) having one of the predefined set of frequencies, in response to the current index value from stage 10.

In mixing stage 14, the tone output from stage 12 is added to (mixed with) the mono signal AD (which may be a PCM signal indicative of speech by the current dominant participant) from stage 10. The resulting mono signal (to which the tone has been mixed) is asserted from stage 14 to encoding stage 16, in which it is encoded. The encoded bit stream output from encoding stage 16 (an encoded monophonic audio signal) is then transported over link 2 (e.g., over a mono audio channel of link 2).

In an alternative implementation, the index determined by stage 10 (and asserted to stage 12) corresponds to (and identifies) one of the input audio streams A1-AN which includes speech uttered by a currently dominant participant, and stage 10 selects all the streams A1-AN (or some of the streams A1-AN, including the stream including the dominant participant's speech) for encoding. In such implementation, stage generates a mixed monophonic audio signal by mixing together the selected streams (each indicative a speech of a different participant, including the dominant participant). Stage 10 asserts this mixed mono signal (AD) to stage 14, where it is mixed with the tone corresponding to the current index, and the mixed mono signal output from stage 14 is encoded in stage 16. Optionally, during mixing of the selected streams in stage 10, stage 10 applies relatively low gain to each stream indicative of a non-dominant participant's speech and higher gain to the stream indicative of the dominant participant's speech.

Signal AD is a monophonic signal representing utterances of a conference participant who is a dominant talker (i.e., a monophonic signal indicative of sound uttered by a dominant conference participant), and optionally also other utterances of at least one other conference participant. The tone mixed with signal AD (in element 14) is a metadata signal which facilitates spatial synthesis of an output soundfield (for playback on multiple loudspeakers) indicative of the content (conference participant utterances) of signal AD. For example, the metadata signal may facilitate upmixing (in stages 28 and 30 of endpoint 3) for rendering of the sound indicated by signal AD as an output soundfield (for playback on multiple loudspeakers) indicative of the content of signal AD (e.g., an output soundfield containing only utterances of a dominant conference participant), which will be perceived as being emitted from an apparent source position (determined by the metadata signal) relative to the listener. The apparent source position does not necessarily, and does typically not, coincide with the position of a loudspeaker of the loudspeaker array (e.g., a pair of headphones) employed to render the soundfield.

Server 1 typically performs other (conventional) processing on the input audio signals A1-AN to generate the encoded audio output which is asserted to link 2, e.g., in additional subsystems or stages (not shown in FIG. 1). Elements 10, 12, 14, and 16 of server 1 may be implemented in a media gateway (MGW) subsystem of server 1, and server 1 may include at least one additional subsystem (e.g., a mediation server subsystem) not shown in FIG. 1. Speech encoder stage 16 is coupled and configured to encode the monophonic signal output from stage 14 and to assert the resulting encoded monophonic audio signal to link 2.

Endpoint 3, also coupled to link 2, is configured to receive (and decode) encoded monophonic audio signals that have been transmitted over link 2 from server 1 (and/or another endpoint not shown in FIG. 1), and to render the decoded audio for playback on speaker set 5, including by performing necessary pre-processing on each received audio signal. Endpoint 3 may be a mobile telephone.

Endpoint 3 includes monophonic audio decoder stage 20, which is coupled and configured to decode the output of encoder 16 of server 1 (received via link 2) to determine (and output to endpoint 3's notch filter 24) a decoded monophonic audio signal. The decoded signal is indicative of the mixed, monophonic speech and tone signal output from stage 14 of server 1.

The decoded signal output from stage 20 typically includes a tone (generated by stage 12 of server 1) whose frequency is one of the one of the predefined set of frequencies, each corresponding to a different value of the index determined by stage 10. Tone detector 22 of endpoint 3 is configured to detect any such tone included in the decoded signal, and to assert to notch filter 24 a control value indicative of the tone's frequency (or the index corresponding to the tone's frequency). In response to the control value, notch filter 24 notch-filters out at least some (and typically at least substantially all) of the content of the decoded signal which has the frequency of the detected tone.

Tone detector 22 may implement a Goertzel tone detection algorithm (of the type described in the above-cited paper by Goertzel), which produces a measure of the power of the decoded signal at each of the frequencies of the set chosen to represent the original indexes. When detector 22 has identified the frequency (one of the predefined set of frequencies) corresponding to the predominant power measure, and asserted a control value indicative of this frequency to notch filter 24, the decoded signal is processed through notch filter 24 so as to remove the tone (added by stage 14 of server 1) from the speech signal. The resulting mono audio stream, and the decoded index, can then be processed in elements 30 and 32 in accordance with a panning algorithm to produce a binaural audio stream that is finally played through the user's headset or headphones (or other loudspeakers), to give the user the impression that the current dominant talker is located at a particular apparent location determined by the index (e.g., a specific angle, determined by the index, relative to the median plane), spatially separated from the apparent locations of other conference participants.

Typically, endpoint 3 also includes elements 28, 30, and 32, coupled as shown in FIG. 1, and configured to generate multi-channel speaker feeds in response to the notch-filtered monophonic audio output signal generated by filter 24 (or a processed version thereof, output from processing stage 26). In typical operation, the notch-filtered audio signal output from filter 24 (identified in FIG. 1 as signal "AD") is a reconstructed version of the signal AD output from stage 10 of server 1. Speaker set 5, comprising two or more speakers (e.g., a set of headphones), is coupled to receive the speaker feeds and to emit sound in response to the speaker feeds.

Optionally, additional processing (e.g., conventional noise reduction) is performed in audio processing stage 26 on the notch-filtered monophonic audio signal AD output from filter 24, to generate processed monophonic audio AD' which is asserted to panning stage 30. Optionally, stage 26 is omitted and the monophonic audio AD output from filter 24 is asserted directly to stage 30.

In response to the control value asserted by tone detector 22, which is indicative of the frequency of the most recently detected tone (or the index corresponding to this frequency), mapping stage 28 determines an apparent position (typically an angle relative to the median plane of the user's assumed position, i.e., the azimuth in the horizontal plane of the user's assumed position). Stage 28 asserts to panning stage 30 a control value, identified as "A" in FIG. 1, indicative of this apparent position. In response, stage 30 upmixes the mono audio signal AD (or AD') in accordance with a panning algorithm to produce multiple audio channels (identified as "M" in FIG. 1) indicative of a binaural audio stream.

In response to the binaural audio stream, driver stage 32 generates multiple (multi-channel) speaker feeds for driving the speakers of speaker set 5 to playback the speech indicated by signal AD as a binaural signal, in such a manner that the speech (including, or consisting of, speech uttered by the currently dominant conference participant) is perceived as emitting from an apparent source whose position is determined by the index indicated by the tone most recently identified by stage 22. This gives the user the impression that each different conference participant (determined by, and corresponding to, a different tone frequency and the index value corresponding to said tone frequency) is located in a different apparent position relative to the user.

Typically, the speech of each participant (when the participant is dominant) is perceived as emitting from a different azimuth angle in the horizontal plane of the user's assumed position (e.g., the horizontal plane through the midpoints of the speakers of a pair of headphones worn by the user). The apparent positions are spatially separated from each other. Perception of the soundfield determined by the multi-channel speaker feeds, rather than monophonic audio (determined by the mono signal output from filter 24 or stage 26), improves the user's experience of the conference call.

The rendering algorithm implemented by stages 30 and 32 can be a conventional algorithm, performed using existing technology of a type which has been implemented in an efficient manner on a number of embedded platforms. However, the rendering algorithm implemented by stages 30 and 32 has not been implemented to generate multi-channel speaker feeds (for rendering a soundfield) in response to monophonic audio received (with metadata regarding at least one telephone conference participant) over a mono audio channel of a teleconferencing system (e.g., a CS teleconferencing system), where the metadata determines apparent position (perceived by one listening to the rendered soundfield) of a source of speech uttered by a currently dominant conference participant.

In variations on the FIG. 1 embodiment of endpoint 3, an endpoint of a teleconferencing system is configured to render only monophonic audio (including by generating a single speaker feed for driving a loudspeaker). In such variations, elements 28 and 30 of FIG. 1 would be omitted, and element 32 would be replaced by a monophonic driver stage coupled and configured to generate the speaker feed in response to the notch-filtered monophonic audio output signal generated by filter 24 (or a processed version thereof, output from processing stage 26).

Typical embodiments of the invention have the advantage of requiring very limited extra processing compared to that performed by a traditional CS teleconferencing system. This is especially important for receiver-side embodiments of the invention, since a typical embodiment of the inventive receiver can be an embedded platform (e.g., a mobile phone) with limited resources. In typical sender-side embodiments of the invention, (e.g., a typical implementation of server 1 of FIG. 1), the generation of the different tones (to be mixed with the speech content to be encoded) can rely efficiently on pre-computed Read-Only Memory (ROM) tables. In typical receiver-side embodiments of the invention, (e.g., a typical implementation of endpoint 3 of FIG. 1), the algorithm (e.g., the Goertzel algorithm or a similar algorithm) performed for tone detection (e.g., by typical embodiments of tone detection stage 22) can be implemented as a simple second-order Infinite Impulse Response (IIR) filter, which requires very little state memory and very few arithmetical operations. Also in typical receiver-side embodiments of the invention, the tone filtering (e.g., performed by notch filter 24 of endpoint 3 of FIG. 1) can be implemented efficiently with a simple filter.

Various embodiments of the invention can in principle achieve satisfactory results with any metadata tone having frequency in the range (typically 300 Hz to 3.4 kHz for most codecs) supported by the encoder employed to encode the mono signal (speech with embedded metadata tone) to be encoded, and the range (typically 300 Hz to 3.4 kHz for most codecs) supported by the decoder employed to decode the encoded mono signal. However, the least speech quality degradation is achieved by choosing a metadata tone frequency in a region of the range where speech energy is low, so that the impact of the notch filter on the original speech signal is limited. For this reason, better results can typically be achieved by implementing the invention with encoders and decoders (e.g., codecs) of the type employed in the context of wideband calls, for example with a codec compliant with the AMR-WB (Adaptive Multi-Rate-Wideband) standard, also known as G722.2, standardized by the Telecommunication Standardization Sector of the International Telecommunications Union (ITU-T) and the Third Generation Partnership Project (3GPP). In embodiments employing AMR-WB compliant codecs (which support the frequency range of 50 Hz-7 kHz), the metadata tone frequencies can be chosen to be in the region of 5 kHz to 6.4 kHz, where speech energy is typically not as high as in the traditional narrowband range (300 Hz to 3.4 kHz), while still being within the band typically used by the encoder to calculate Linear Predictive Coding (LPC) parameters to be transmitted to the receiver.

Moreover, for a large proportion of people (although hearing sensitivity as a function of frequency varies between individuals), the frequencies in the region of 6 kHz fall into the well-known "pinna notch," so that they are not perceived as well as other frequencies. By using frequencies within (or near to) the pinna notch to determine the metadata signal employed in accordance with the invention, the side-effect of slightly degrading the original speech signal in that range (by notch-filtering out the metadata signal at the receiver side), will typically not be as detrimental as it would be if other frequencies were used to determine the metadata signal.

The number of tones in the set of tones (or other signals) to be used to indicate metadata in accordance with the invention can be determined in an empirical manner for a given conferencing system, e.g., it may be (or be based on) the typical number of active participants in a typical call, with additional logic addressing the case that the actual number of participants in a call exceeds this number. This is one of the design criteria for the mixing logic implemented by a typical, conventional conference server. As to the particular frequencies of the set of metadata signal (e.g., tone) frequencies to be used, the minimum step between two consecutive frequencies in the set can be chosen as the inverse of the audio frame length, which provides enough separation for the Goertzel algorithm to provide adequate results. A larger step (between consecutive frequencies) might be preferable in case the codec in use introduces a spread of some frequencies in a neighboring range.

In some embodiments of the invention, the topology of the link (e.g., link 2) which separates the sender and the receiver is such that additional signal processing takes place between initial encoding (e.g., in element 16 of sever 1) and final decoding (e.g., in element 20 of endpoint 3). Examples of such additional processing are transcoding to a different signal representation (for example, G.711 encoding using A-law or µ-law for transport over a Public Switched Telephone Network (PSTN) link), and speech enhancement (for example, noise reduction). In cases in which such additional processing is performed, the invention may not provide its full benefits since the in-band signaling tone may be attenuated or distorted by the additional processing, so as to become more difficult or impossible to detect at the receiving end. However, many conventional teleconferencing systems (e.g., modern Public Land Mobile Networks (PLMNs)) do not employ such additional processing, in an effort to avoid any alteration of the original signal and subsequent loss of quality. This is the principle of Transcoder-Free Operation ("TrFO," described in 3GPP Technical Specification 23.153, at http://www.3gpp.org/ftp/Specs/html-info/23153.htm). TrFO is a network mode of operation that can provide the full benefits of wideband speech intelligibility by removing any intermediate signal processing between the two endpoints of a call when both support AMR-WB. Typically, preferred embodiments of the invention are those in which the metadata tone transmission is not altered in any way (or in any significant way) between initial encoding and final decoding in the receiver.

In a class of embodiments, metadata signal (e.g., tone) embedding is performed in an optimized manner. Typically, the only times at which the receiver needs to be informed that the apparent source position of rendered audio (e.g., the azimuth angle of the apparent source) should change are the times at which there is a switch between two dominant talkers. The apparent source position of the rendered audio does not need to change when a single dominant talker keeps talking for an interval of time. For that reason, the metadata signal typically only needs to be mixed with speech content to be encoded at the beginning of the transmission of a new dominant talker's speech. At each such point (i.e., in response to each new metadata signal), the rendering algorithm on the receiver side can be reconfigured to implement the appropriate new apparent source position (e.g., the new azimuth angle), after which operation of the receiver can continue unchanged until a subsequent metadata signal is received (i.e. at the beginning of transmission of a new dominant talker's speech). Such an implementation not only keeps the processing load to a minimum both on the transmitting and receiving side (since it allows all modules for metadata signal generation, mixing, detection and filtering to be bypassed during most time intervals of each conference), but also minimizes the quality degradation that may be caused by the notch filtering in the receiver (i.e., the notch filtering can be disabled or bypassed except during time intervals corresponding to starts of speech by new dominant talkers). An implementation of stage 10 of server 1 can include the necessary logic for so controlling metadata signal embedding, and an implementation of stage 20 of endpoint 3 can include the necessary logic for so controlling metadata signal detection, notch filtering, and rendering with changing apparent source position.

In case the inventive speech encoder is itself configured to use Discontinuous Transmission (DTX) mode, whereby sections of the signal with no active speech are only encoded as a regular update of background noise description parameters, there is a risk that an interval of metadata signal mixing will fall in a period of no transmission, which would compromise the reconfiguration of the rendering subsystem on the receiving side. For this reason, controlling the tone generation not only based on the mixing algorithm, but also on the state of the speech encoder, provides extra robustness to the mechanism. For example, operation of the tone generator could be enabled in response to each occurrence of detection of speech (e.g., by an implementation of stage 10 of server 1) by a new dominant participant, and allowed to stay enabled (active) until the first occurrence of: marking of a small number of frames of input audio data (e.g., one frame or a few frames) as SPEECH (from a DTX perspective); and detection of speech by a different dominant participant. Information indicative of the number of input data frames marked as SPEECH is typically easy to access since it typically appears in the header of each encoded speech frame.

Finally, in order to add further robustness to embodiments of the inventive system, even in cases in which there is a break of transcoder-free operation ("TrFO"), so that detection of an embedded metadata signal by the receiver is prevented for an interval of time (e.g., due to occurrence of transcoding to a narrowband-domain codec, or other network-based processing), it may be preferable to continue to send the metadata signal (e.g., periodically) in situations in which the dominant talker has not actually changed. For example, the tone may be sent at the beginning of every other speech burst (every odd-numbered event of switching of the encoded frame type from NO_DATA or SID_FIRST/SID_UPDATE to SPEECH), or even less frequently (e.g., in response to control signals asserted by an implementation of stage 10 of server 1). This can act as a confirmation to the receiver that the metadata signal (indicative of spatial information regarding apparent source position) is still being transmitted successfully over the network (e.g., after an episode of network-based processing has prevented such successful transmission for a duration of time), so that the rendering subsystem does not need to be reconfigured. Indeed, in the event that a number of successive speech bursts were received with no metadata signal being detected, the receiver could revert back to a traditional monophonic rendering of the received signal (i.e., to drive each speaker of the user's headphones or other multiple loudspeaker set with the same mono signal), which is typically preferable to a binaural rendering of all voices on one particular side of the median plane. In some embodiments, the inventive receiver is configured so that, if metadata signals are detected again after an interval of time in which they were missing (e.g., when TrFO is re-established after it had broken), the receiver would re-activate the notch filter and binaural rendering subsystem so that the user would again benefit from the spatial experience provided by processing in accordance with the invention.

In order to reduce the processing load and loss of rendered audio quality, some embodiments of the inventive receiver (or teleconferencing system endpoint) include audio hardware dependent logic (e.g., logic 29 of endpoint 3, shown in phantom view to indicate that it is optional). For example, if the logic determines that the device is coupled to a single loudspeaker rather than to a headset or pair of headphones (or other multi-loudspeaker set), it may disable (or deactivate) a spatial rendering subsystem of the device (so that the device operates in a mode in which it generates only a monophonic speaker feed rather than multi-channel speaker feeds), since only tone detection and notch filtering are needed in that case.

On the sender side, processing load can also be reduced if the sender (e.g., server 1 of FIG. 1) is made aware that spatial rendering is not active on the receiver side. This could be implemented for example as an automated prompt generated by the call server (e.g., by an implementation of server 1 of FIG. 1) when a new endpoint connects to a conference, whereby the server asks each joining user's endpoint whether the endpoint does or does not implement a spatial rendering mechanism. If the answer from an endpoint is 'no', the sender enters an operating mode in which it simply bypasses metadata signal (e.g., tone) generation and mixing and encodes the speech signal directly. This mode also has the advantage that no speech degradation will occur, even if no notch filtering of a received and decoded speech signal is performed on the receiver side. Alternative ways of providing mode-determining information to the server can also be employed. For example, a tone can be sent from a receiver to a sender on an uplink signal path at the beginning of a call, and the sender can be configured to control a switch in response to the tone so as to enable or disable metadata signal generation and mixing.

In variations on the FIG. 1 system, some metadata signal other than a tone (having a frequency indicative of a currently dominant conference participant) is mixed with the monophonic audio to be encoded, where the monophonic audio has a frequency range, the metadata comprises frequency components in the frequency range, the metadata signal is indicative of an apparent source position of a currently dominant participant in the teleconference (e.g., a currently active talker or the loudest one of multiple active talkers), and the monophonic audio is indicative of speech uttered by the currently dominant participant (and optionally also speech uttered by at least one other participant in the teleconference). For example, the metadata signal could be a burst of some predetermined audio signal (e.g. a predetermined burst of speech). The alternative metadata signal employed in such variations could be asserted from a metadata generation subsystem (replacing element 12 of server 1 of FIG. 1) to a mixing element (e.g., element 14 of server 1 of FIG. 1) in which is it mixed with the monophonic audio to be encoded. Similarly, the endpoint which receives and decodes the transmitted, encoded, mixed signal would include a metadata signal detection subsystem (replacing element 22 of endpoint 3 of FIG. 1), and would typically include a metadata filtering subsystem (filter 24 of endpoint 3 of FIG. 1, or a filter which replaces element 24 of endpoint 3) configured to filter (at least partially) the metadata signal out from the monophonic audio and to assert the resulting filtered monophonic audio to the rendering subsystem.

Figure 2:
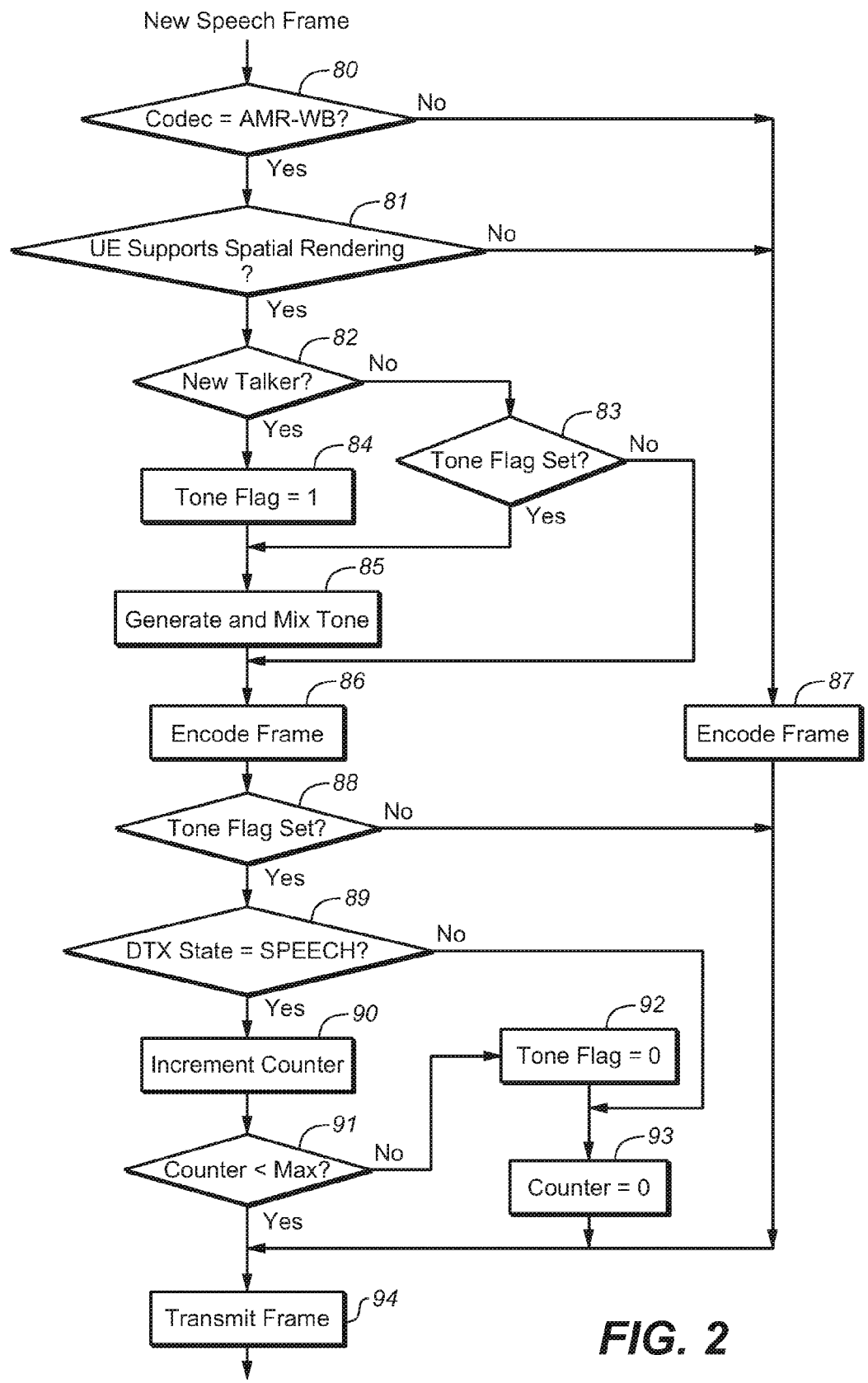
FIG. 2 is a flow chart of steps performed in an embodiment of the inventive method.

FIG. 2 is a flow chart of steps performed in an embodiment of the inventive method. FIG. 2 indicates a simplified example of the logical flow of decisions and actions that may be implemented by the sending equipment (e.g., by an implementation of server 1 of FIG. 1). For simplicity, not all the logic described above is implemented in the FIG. 2 example.

Initial step 80 of the FIG. 2 method is to determine whether the current frame of monophonic audio to be encoded (e.g., the current frame of the signal AD output from stage 10 of server 1) is to be encoded in a wideband encoder having a frequency range extending up to a frequency at least substantially equal to 7 kHz (e.g., whether the encoder is compliant with the above-mentioned AMR-WB standard). If the current frame is to be encoded in an encoder which is not a wideband encoder, then step 87 is performed to encode the frame (e.g., in encoder 16 of server 1) without embedding any metadata tone therein, and step 94 is performed to transmit the encoded frame (e.g., to assert it to link 2 for transmission).

If the current frame is to be encoded in an encoder which is a wideband encoder, then step 81 is performed to determine if the endpoint to receive the encoded frame (e.g., endpoint 3 of FIG. 1) supports spatial rendering. If it is determined that the endpoint does not support spatial rendering (i.e., if it only supports rendering of monophonic audio), then step 87 is performed to encode the frame without embedding any metadata tone therein, and step 94 is performed to transmit the encoded frame (e.g., to assert it to link 2 for transmission).

If it is determined in step 81 that the endpoint supports spatial rendering, then step 82 is performed to determine whether the current frame is indicative of speech by a new dominant conference participant. If it is determined in step 82 (e.g., by stage 10 of server 1) that the current frame is not indicative of speech by a new dominant conference participant (e.g., if the current frame is indicative of speech by the same dominant conference participant as was the previous frame), then step 83 is performed to determine whether a tone flag has been set (e.g., to the binary value 1). If it is determined in step 83 that the tone flag has not been set (e.g., if it has the binary value 0), then step 86 is performed to encode the frame without embedding any metadata tone therein. If it is determined in step 83 that the tone flag has been set (e.g., if it has the binary value 1), then step 85 is performed.

If it is determined in step 82 (e.g., by stage 10 of server 1) that the current frame is indicative of speech by a new dominant conference participant, then step 84 is performed to set the tone flag (e.g., to the binary value 1), step 85 is then performed (e.g., by stage 12 of server 1) to generate the metadata tone indicative of the new dominant participant and to mix the tone with the current frame, and step 86 is then performed to encode the frame with the metadata tone embedded therein.

After step 86, step 88 is performed to determine whether the tone flag has been set. If it is determined in step 88 that the tone flag has not been set (e.g., if it has the binary value 0), then step 94 is performed to transmit the encoded frame with the metadata tone embedded therein. If it is determined in step 88 that the tone flag has been set (e.g., if it has the binary value 1), then step 89 is performed to determine whether the Discontinuous Transmission (DTX) state of the encoder is a "SPEECH" state in which the full encoded current frame is to be transmitted.

If it is determined in step 89 that the DTX state of the encoder is a "SPEECH" state, then step 90 is performed to increment a counter and step 91 is then performed to determine whether the count (indicated by the counter) is less than a maximum count value. If the count is less than the maximum count value, then step 94 is performed to transmit the encoded current frame (e.g., to assert it to link 2 for transmission).

If it is determined in step 91 that the count is equal to the maximum count value, then step 92 is performed to put the tone flag in its "not set" state (e.g., to give it the binary value 0), step 93 is then performed to reset the counter to its initial value (the value 0), and then step 94 is performed as transmission of the current encoded frame with the metadata tone embedded therein.

If it is determined in step 89 that the DTX state of the encoder is not a "SPEECH" state (so that the full encoded current frame should not be transmitted), then step 93 is performed to reset the counter to its initial value (the value 0), and then step 94 is performed as transmission of an update of background noise description parameters (rather than transmission of the full encoded current frame).

Figure 3:
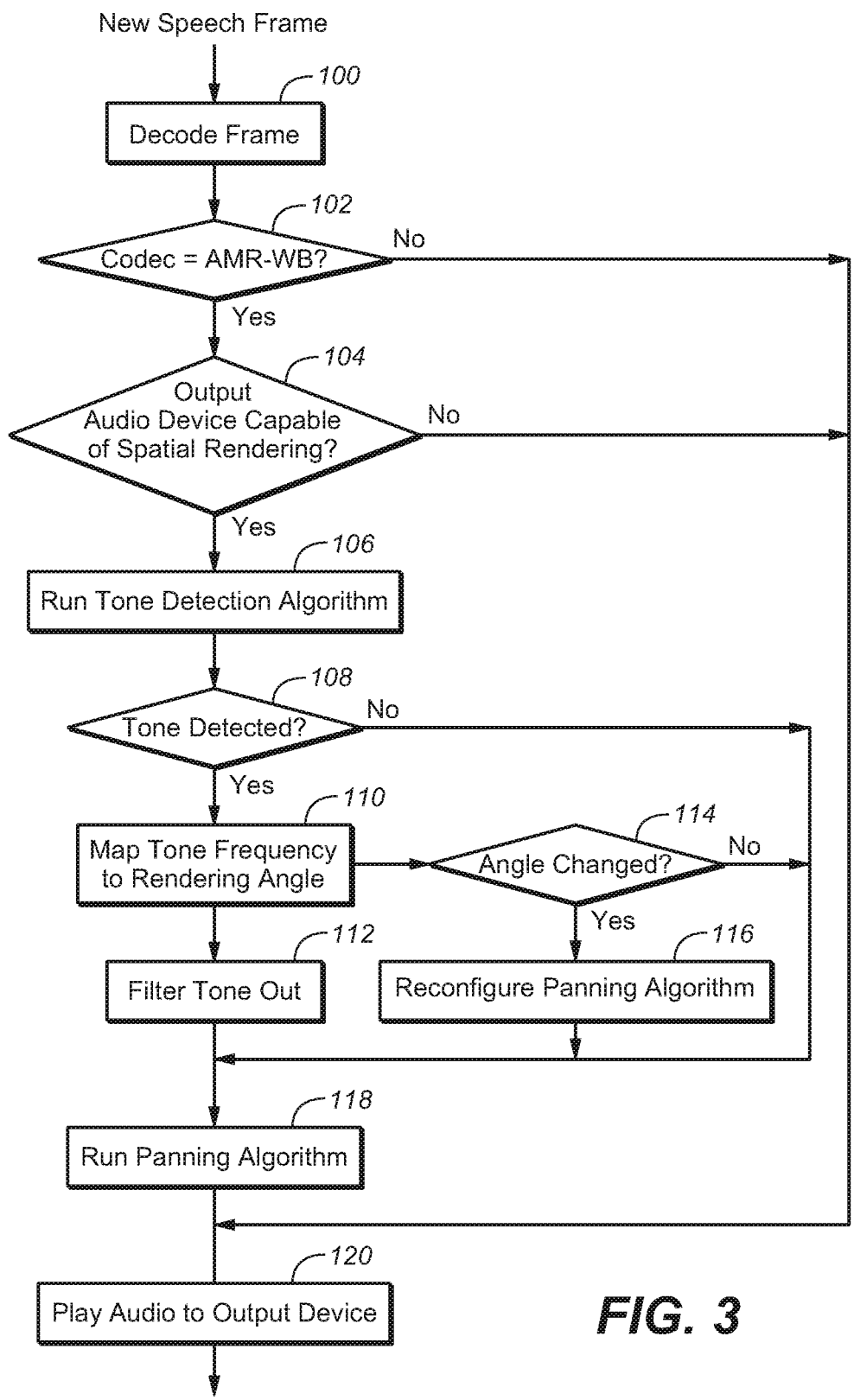
FIG. 3 is a flow chart of steps performed in another embodiment of the inventive method.

FIG. 3 is a flow chart of steps performed by a receiver (e.g., an endpoint of a teleconferencing system) in an embodiment of the inventive method, in which the receiver receives encoded audio that has been encoded and transmitted in accordance with the above-described method of FIG. 2. FIG. 3 indicates a simplified example of the logical flow of decisions and actions that may be implemented by the receiver (e.g., by an implementation of endpoint 3 of FIG. 1). For simplicity, not all the logic described above is implemented in the FIG. 3 example.

Initial step 100 of the FIG. 3 method is to decode (e.g., in stage 20 of endpoint 3) the current frame of monophonic encoded audio received by the receiver.

After step 100, step 102 is performed to determine whether the current frame of monophonic audio (e.g., the current decoded frame output from stage 20 of endpoint 3) was encoded in a wideband encoder having a frequency range extending up to at least 7 kHz and was decoded in a wideband decoder having a frequency range extending up to at least 7 kHz (e.g., to determine whether each of the encoder and decoder is compliant with the above-mentioned AMR-WB standard). If the current frame was encoded in an encoder that is not a wideband encoder (or was decoded in a decoder that is not a wideband decoder), then the remaining steps assume that no metadata tone was embedded in the audio content by the encoder, and step 120 is performed (after step 102) to generate a single monophonic speaker feed in response to the frame and drive a loudspeaker (or each loudspeaker of a set of speakers) with the single speaker feed to play the decoded monophonic audio.

If it is determined in step 102 that the current frame was encoded in a wideband encoder and was decoded in a wideband decoder, then step 104 is performed to determine whether the receiver is capable of spatial rendering (i.e., whether the receiver is configured to generate multiple speaker feeds in response to the decoded mono audio and to perform spatial rendering using the multiple speaker feeds, or whether the receiver only supports rendering of monophonic audio). If it is determined in step 104 that the receiver does not support spatial rendering (i.e., if it only supports rendering of monophonic audio), step 120 is then performed to generate a single monophonic speaker feed in response to the decoded frame and drive a loudspeaker (or each loudspeaker of a set of speakers) with the speaker feed to play the decoded monophonic audio.

If it is determined in step 104 that the receiver supports spatial rendering, steps 106 and 108 are then performed (e.g., in stage 22 of endpoint 3 of FIG. 1) to detect whether a metadata tone is embedded in the current decoded frame and if so, to detect (in step 108) the frequency of the embedded metadata tone. If it is determined in steps 106 and 108 that no metadata tone is embedded in the current decoded frame, then step 118 is performed to upmix the current decoded frame (a mono audio signal) in accordance with a previously configured panning algorithm to produce multiple audio channel signals indicative of a binaural audio stream, and step 120 is then performed to generate multiple speaker feeds in response to the upmixed audio channel signals and to drive multiple speakers (e.g. a pair of headphones) with the speaker feeds to achieve spatial rendering of the audio indicated by the decoded frame. This is done in such a manner that the sound emitted by the speakers is perceived as emitting from a specific apparent source position (e.g., a specific azimuth angle in the horizontal plane of the user's assumed position) determined by the parameters assumed by the panning algorithm (such parameters would typically have been determined in response to a metadata tone that was embedded in a previous frame of decoded monophonic audio).

If it is determined in steps 106 and 108 that a metadata tone is embedded in the current decoded frame, then step 110 is performed (e.g., by stage 28 of endpoint 3 of FIG. 1) to map the frequency of the tone to a spatial rendering parameter indicative of a specific apparent source position (e.g., a specific azimuth angle in the horizontal plane of the user's assumed position), and step 112 is then performed (e.g., by notch filter 24 of endpoint 3 of FIG. 1) to filter the tone out from the current decoded frame. The apparent source position corresponds to the identity of a currently dominant conference participant, as indicated by the frequency of the embedded metadata tone.

After performing step 110, step 114 is performed to determine whether the apparent source position determined by the tone embedded in the current decoded frame is different than an apparent source position determined by the previous decoded frame (e.g., by the frequency of a tone embedded in the previous frame). If it is determined in step 114 that the current apparent source position is the same as the apparent source position for the previous frame, then step 118 is performed to upmix the current decoded frame (a mono audio signal) in accordance with a panning algorithm to produce multiple audio channel signals indicative of a binaural audio stream, with the panning algorithm assuming the same apparent source position as it assumed during upmixing of the previous frame.

If it is determined in step 114 that the current apparent source position is different from the apparent source position for the previous frame, then step 116 is performed to reconfigure the panning subsystem (the subsystem which executes the panning algorithm) to perform upmixing assuming the current (new) apparent source position. Then, step 118 is performed is performed to upmix the current decoded frame (a mono audio signal) in accordance with the panning algorithm to produce multiple audio channel signals indicative of a binaural audio stream, with the panning algorithm assuming the new apparent source position.

After performance of step 118 on a decoded frame, step 120 is performed to generate multiple speaker feeds in response to the upmixed audio channel signals most recently generated in step 118, and to drive multiple speakers (e.g. a pair of headphones) with the speaker feeds to achieve spatial rendering of the audio indicated by the decoded frame, so that the sound emitted by the speakers is perceived as emitting from a specific apparent source position (e.g., a specific azimuth angle in the horizontal plane of the user's assumed position) determined by the parameters that were assumed by the panning algorithm to generate the upmixed audio channel signals.

One possible alternative to the specific embodiments disclosed herein is for metadata (indicative of the spatial audio information needed for spatial rendering of the monophonic audio stream to be transmitted) to be added to the stream in the encoded domain rather than the unencoded (e.g., PCM) domain. For example, in the case that a AMR-WB compliant codec is employed to encode the audio, each encoded speech frame would include a number of unused bit positions, both in the header (3 bits, and thus eight available metadata values) as well as the payload (3 or more bits, depending which bitrate is used) that could be exploited to encode an index identifying a currently dominant conference participant. An important advantage of such an implementation is that the speech quality would not be affected by the metadata signaling, while the overall memory footprint of speech frames would stay unchanged at least at the byte granularity. However, such an implementation would not be practical (if it utilized a conventional codec) unless the relevant speech codec specification were changed to associate the relevant bit positions (employed in accordance with the invention to indicate metadata) with the corresponding metadata. This is because use of the bit positions to indicate metadata (in accordance with the present invention) would not be contemplated by the conventional codec specification, and thus the bits might not be transferred at all on some conventional network interfaces (e.g., the Iu interface of conventional Public Land Mobile Networks (PLMNs), even in the case of TrFO).

In typical embodiments, the invention is a circuit-switched (CS) teleconferencing system, or an element (e.g., a server or endpoint) of such a system or a method of operation of such an element. In alternative embodiments, the inventive system is a teleconferencing system of another type (e.g., a packet-switched teleconferencing system), or an element (e.g., a server or endpoint) of such other system, or a method of operation of such an element. However, all such embodiments generate or employ monophonic audio mixed with a metadata signal (e.g., a metadata tone having a frequency indicative of apparent source position of a currently dominant conference participant), which is encoded (e.g., including by packetization) for transmission as encoded monophonic audio by a link of a teleconferencing system. Decoding of such encoded monophonic audio would recover the original mix of monophonic audio and metadata signal. It is not contemplated that any embodiment of the invention generates, sends, receives, or otherwise employs (in place of monophonic audio mixed with a metadata signal, and then encoded for transmission as encoded monophonic audio by a link of a teleconferencing system):

monophonic audio which is sent (without metadata) in packets over a link of a teleconferencing system, and metadata (e.g., metadata indicative of a currently dominant conference participant) sent in other packets over the same link, or monophonic audio which is sent over a link of a teleconferencing system within predetermined slots or segments within packets, and metadata (e.g., metadata indicative of a currently dominant conference participant) which is sent in different predetermined slots or segments within the packets.

Aspects of the invention include a system or device configured (e.g., programmed) to perform any embodiment of the inventive method, and a computer readable medium (e.g., a disc) which stores code for implementing any embodiment of the inventive method or steps thereof. For example, the inventive system can be or include a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and a processing subsystem that is programmed (and/or otherwise configured) to perform an embodiment of the inventive method (or steps thereof) in response to data asserted thereto.

The FIG. 1 system (or server 1 or endpoint 3 of the FIG. 1 system) may be implemented as a configurable (e.g., programmable) digital signal processor (DSP) that is configured (e.g., programmed and otherwise configured) to perform required processing on audio signal(s), including performance of an embodiment of the inventive method. Alternatively, the FIG. 1 system (or server 1 or endpoint 3 of the FIG. 1 system) may be implemented as a programmable general purpose processor (e.g., a personal computer (PC) or other computer system or microprocessor, which may include an input device and a memory) which is programmed with software or firmware and/or otherwise configured to perform any of a variety of operations including an embodiment of the inventive method. A general purpose processor configured to perform an embodiment of the inventive method would typically be coupled to an input device (e.g., a mouse and/or a keyboard), a memory, and a display device.

Another aspect of the invention is a computer readable medium (e.g., a disc) which stores code for implementing any embodiment of the inventive method or steps thereof.

While specific embodiments of the present invention and applications of the invention have been described herein, it will be apparent to those of ordinary skill in the art that many variations on the embodiments and applications described herein are possible without departing from the scope of the invention described and claimed herein. It should be understood that while certain forms of the invention have been shown and described, the invention is not to be limited to the specific embodiments described and shown or the specific methods described.

What is claimed is:

1. A method for preparing a monophonic audio signal for transmission to at least one node of a teleconferencing system, wherein the monophonic audio signal is indicative of speech, in a frequency range, by a currently dominant participant in a teleconference, said method comprising:
   generating a monophonic mixed audio signal, including by mixing a signal with the monophonic audio signal in a mixing element, wherein the signal has a frequency in the frequency range and is indicative of an apparent source position of the currently dominant participant in the teleconference; and
   encoding the mixed audio signal to generate a monophonic encoded audio signal.

2. The method of claim 1, said method also including a step of: transmitting the monophonic encoded audio signal over a monophonic audio channel of a link of the teleconferencing system.

3. The method of claim 1, wherein the monophonic audio signal is indicative of said speech, in the frequency range, by the currently dominant participant and also speech in the frequency range by at least one other participant in the teleconference.

4. The method of claim 1, wherein the teleconferencing system includes a server, and the generating is performed by the server.

5. The method of claim 1, wherein the frequency range extends up to a frequency at least substantially equal to 7 kHz, and the frequency of the signal is in the range from 5 kHz to 6.4 kHz.

6. The method of claim 1, also including steps of:
   determining a set of apparent source positions, each of the apparent source positions in the set corresponding to a different participant in the teleconference; and
   generating a signal such that said signal is indicative of one of the apparent source positions in the set.

7. The method of claim 6, wherein each of the apparent source positions in the set is a different angle relative to a median plane associated with a user of the node.

8. A method for processing an encoded monophonic audio signal received at a node of a teleconferencing system, wherein the encoded monophonic audio signal is an encoded version of a monophonic mixed audio signal comprising a monophonic audio signal with which a signal was mixed in a mixing element prior to encoding, the monophonic audio signal is indicative of speech, in a frequency range, uttered by a currently dominant participant in a teleconference, and the signal has a frequency component in the frequency range and is indicative of an apparent source position of the currently dominant participant, said method including the steps of:
   decoding the encoded monophonic audio signal to determine the monophonic mixed audio signal; and
   processing the monophonic mixed audio signal to identify the signal, and determining from the signal the apparent source position corresponding to the currently dominant participant.

9. A teleconferencing system, including:
   a link;
   a server coupled to the link; and
   endpoints coupled to the link,
   wherein the server is configured to generate a monophonic mixed audio signal, including by mixing a signal with a monophonic audio signal, the monophonic audio signal is indicative of speech, in a frequency range, by a currently dominant participant in a teleconference, the signal has a frequency in the frequency range, and the signal is indicative of an apparent source position of the currently dominant participant in the teleconference,
   the server is also configured to encode the mixed audio signal to generate a monophonic encoded audio signal, and to assert the monophonic encoded audio signal to the link for transmission via the link to the endpoints, and
   at least one of the endpoints is configured to receive and decode the monophonic encoded audio signal to determine the monophonic mixed audio signal, to identify the signal in the monophonic mixed audio signal, and to determine from the signal the apparent source position of the currently dominant participant in the teleconference.

10. The system of claim 9, wherein the at least one of the endpoints is also configured to filter the monophonic mixed audio signal to remove at least partially therefrom the signal, thereby generating a filtered monophonic audio signal, and to render speech determined by the filtered monophonic audio signal as a multi-channel signal, including by generating multi-channel speaker feeds for driving at least two loudspeakers in such a manner that speech uttered by the currently dominant participant is perceived as emitting from the apparent source position determined from the signal.

11. The system of claim 10, wherein said at least one of the endpoints is configured to notch-filter the decoded monophonic audio signal mixed with the signal to remove at least partially therefrom said signal.

12. The system of claim 9, wherein the frequency range extends up to a frequency at least substantially equal to 7 kHz, and the frequency of the signal is in the range from 5 kHz to 6.4 kHz.

13. The system of claim 9, wherein the server is also configured to determine a set of apparent source positions, each of the apparent source positions in the set corresponding to a different participant in the teleconference, and
   to generate the signal such that said signal is indicative of one of the apparent source positions in the set.

14. The system of claim 13, wherein each of the apparent source positions in the set is a different angle relative to a median plane associated with a user of at least one of the endpoints.

* * * * *